United States Patent
Roger et al.

(10) Patent No.: US 9,923,791 B2
(45) Date of Patent: *Mar. 20, 2018

(54) METHOD FOR MONITORING COMMUNICATION BETWEEN A TRANSMITTER AND A RECEIVER

(71) Applicant: Schneider Electric Industries SAS, Rueil-Malmaison (FR)

(72) Inventors: Mireille Roger, Ruelle-sur-Touvre (FR); Alain Tardivon, Gourville (FR); Herve Dallet, Soyaux (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 93 days.

This patent is subject to a terminal disclaimer.

(21) Appl. No.: 15/040,438

(22) Filed: Feb. 10, 2016

(65) Prior Publication Data

US 2016/0277270 A1 Sep. 22, 2016

(30) Foreign Application Priority Data

Mar. 16, 2015 (FR) .................... 15 52094

(51) Int. Cl.
*H04L 12/26* (2006.01)
*H04L 1/18* (2006.01)
*H04L 1/24* (2006.01)

(52) U.S. Cl.
CPC ........ *H04L 43/0823* (2013.01); *H04L 1/1887* (2013.01); *H04L 1/244* (2013.01); *H04L 43/10* (2013.01)

(58) Field of Classification Search
CPC combination set(s) only.
See application file for complete search history.

(56) References Cited

U.S. PATENT DOCUMENTS

2008/0130542 A1 6/2008 Tang
2012/0106369 A1 5/2012 Nagasaka
(Continued)

FOREIGN PATENT DOCUMENTS

EP 2 887 585 A1 6/2015

OTHER PUBLICATIONS

French Preliminary Search Report dated Jan. 27, 2016 in French Application 15 52094, filed on Mar. 16, 2015 ( with English Translation of Categories of Cited Documents and Written opinion).

*Primary Examiner* — Yee Lam
(74) *Attorney, Agent, or Firm* — Oblon, McClelland, Maier & Neustadt, L.L.P.

(57) ABSTRACT

A method is provided for monitoring a communication between a transmitting equipment item and a receiving equipment item, the transmitting equipment item transmitting control frames (TC_i) toward the receiving equipment item. The method makes it possible to optimize the frequency of transmission of diagnostic frames (TDx_i), thereby making it possible to avoid saturating the communication link and causing an overconsumption of electrical energy, while guaranteeing a high reliability concerning the state of the communication. The method makes it possible notably to adapt in real time the transmission of the diagnostic frames (TDx_i) to the state of the communication, by taking account of the fact that disturbances prevent the control frames (TC_i) from being correctly transmitted by the transmitting equipment item or received by the receiving equipment item and to adapt the transmission of the diagnostic frames (TDx_i) to the value of the rate of probability of occurrence of a communication failure ($\tau_{fail}$), this rate being recalculated on each transmission of a control frame.

3 Claims, 4 Drawing Sheets

(56) References Cited

U.S. PATENT DOCUMENTS

| | | | |
|---|---|---|---|
| 2015/0180756 A1* | 6/2015 | Roger | H04L 43/103 370/242 |
| 2016/0156409 A1* | 6/2016 | Chang | H04B 7/2041 370/315 |
| 2016/0277270 A1* | 9/2016 | Roger | H04L 43/0823 |
| 2016/0277950 A1* | 9/2016 | Tardivon | H04L 43/10 |

* cited by examiner

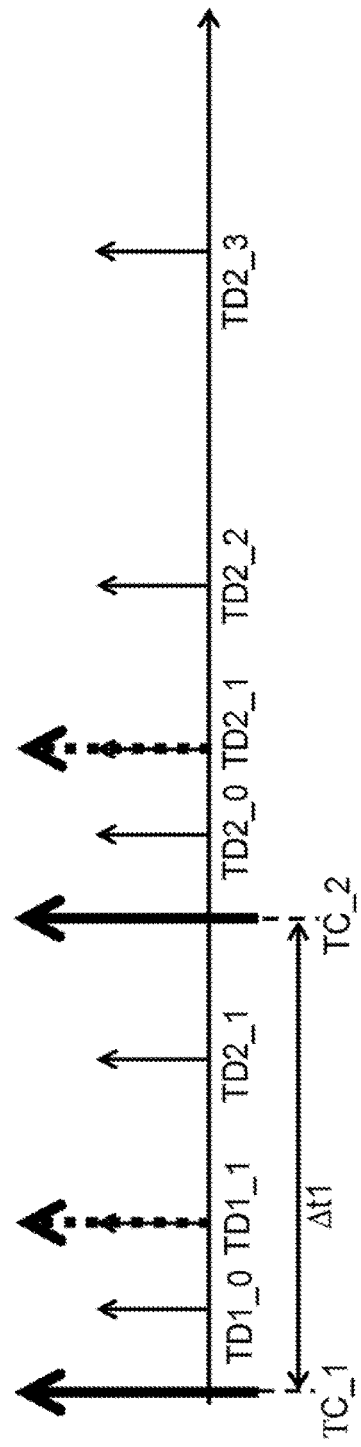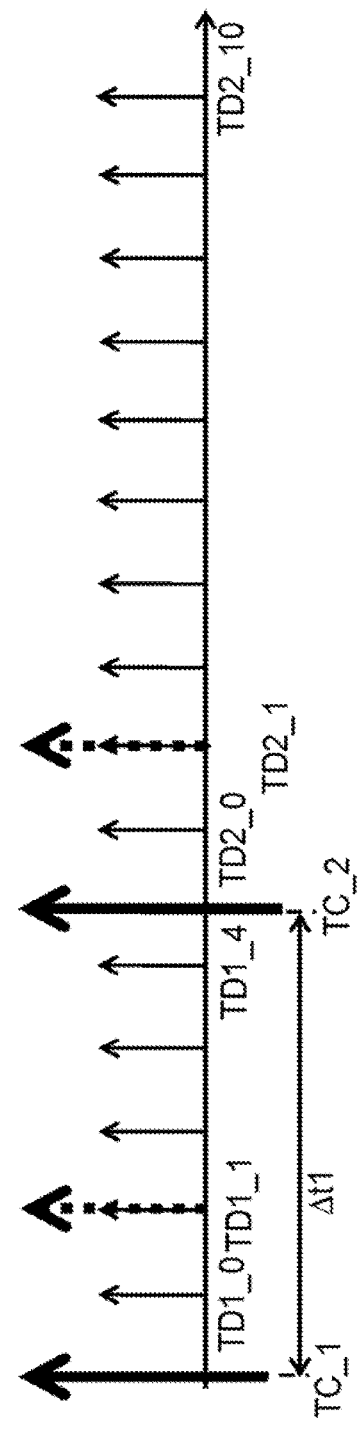

METHOD FOR MONITORING COMMUNICATION BETWEEN A TRANSMITTER AND A RECEIVER

TECHNICAL FIELD OF THE INVENTION

The present invention relates to a method for monitoring a communication between a transmitting equipment item and a receiving equipment item.

STATE OF THE ART

In the industrial world, communication between equipment items has to be reliable because it is instrumental in the control of the machines. Either the communication intrinsically manifests a high level of reliability, which can prove difficult to obtain, or it has to be monitored in order to detect the communication errors between the equipment items. In this second case, it has to be possible to transmit, in addition to the control frames exchanged between the equipment items, diagnostic frames to inform, with a defined level of reliability, as to the state of the communication. The transmission of diagnostic frames makes it possible to detect the communication errors and thus flag these errors. To make it possible to detect a communication error with maximum reliability, the easiest solution consists in transmission of the diagnostic frames at a fixed frequency matched to the highest frequency of transmission of the control frames. However, the transmission of frames at this fixed frequency results in high occupancy, even saturation of the communication link and an overconsumption of electrical energy for the equipment items involved.

Moreover, in an industrial environment, movements of machines, electromagnetic disturbances, metal mass displacements, movements of people within the data exchange zone, the presence of other transmitting equipment items, are likely to create random disturbances in the exchange of data between the transmitting equipment item and the receiving equipment item. These phenomena are notably likely to disturb the communication between the transmitting equipment item and the receiving equipment item.

Patent application US2012/106369 describes a communication monitoring method.

The aim of the invention is to propose a method for monitoring a communication between a transmitting equipment item and a receiving equipment item, which makes it possible to optimize the frequency of transmission of the diagnostic frames thereby avoiding saturating the communication link and causing an overconsumption of electrical energy while guaranteeing a high reliability concerning the state of the communication and to adapt in real time the transmission of the diagnostic frames to the state of the communication, by taking into account the disturbances.

Moreover, within one and the same application, the frequency of transmission of the control frames is not necessarily fixed. In the setting phase, the frequency of transmission may be high whereas it may be low in a normal operating phase. Most of the protocols for monitoring communication between two equipment items do not take account of these different aspects.

SUMMARY OF THE INVENTION

The invention therefore relates to a method for monitoring a communication between a transmitting equipment item and a receiving equipment item, said transmitting equipment item transmitting control frames to the receiving equipment item, said method comprising the following steps:

transmission by the transmitting equipment item of n control frames $TC\_i$ to the receiving equipment item, i being an integer number ranging from 1 to n and defining the rank of each control frame, n being an integer number greater than or equal to 1, determination of an instant of transmission of a diagnostic frame of rank 0 after the transmission of a control frame $TC\_i$, said instant of transmission of said diagnostic frame being determined as follows:

$$TD0\_i = TC\_i + T\mathrm{diag}[0]\_i$$

in which $TD0\_i$ corresponds to the instant of transmission of the diagnostic frame of rank 0 following the control frame $TC\_i$ and with:

$$T\mathrm{diag}[0]\_i = \Delta t - \Delta t\mathrm{diag}$$

in which:

$\Delta t$ corresponds to a predetermined minimum time between the transmission of two control frames, $\Delta \mathrm{diag}$ corresponds to a time to be observed to guarantee the predefined reliability value concerning the state of the communication, and is expressed by the following relationship:

$$\Delta t\mathrm{diag} = \Delta t \frac{\mathrm{Ln}(Fiab)}{\mathrm{Ln}(1 - \tau_{fail})}$$

In which

Fiab corresponds to the predefined reliability value, $\tau_{fail}$ corresponds to a rate of probability of occurrence of a communication failure between two control frames, said rate being revised according to whether the receiving equipment item has received each control frame or not, Ln represents the Neperian logarithm, transmission by the transmitting equipment item of said diagnostic frame at the determined transmission instant, to the receiving equipment item, determination from an increasing function of the instants of transmission of the following diagnostic frames $TDx\_i$ of rank x, said increasing function being chosen to guarantee the predefined reliability between two control frames by transmission instants separated from one another by a variable time, transmission of said diagnostic frames of rank x by the transmitting equipment item to the receiving equipment item.

According to a particular feature, the method comprises a step of revising the predetermined time $\Delta t$ between the transmission of two control frames.

According to another particular feature, the method comprises a step of limitation to a maximum value of the time between two successive diagnostic frames, when the time between a first instant of transmission of a diagnostic frame of rank x and a second instant of transmission of a diagnostic frame of rank x exceeds said maximum value.

The solution of the invention thus makes it possible to take account of the fact that disturbances prevent the control frames from being correctly transmitted by the transmitter or received by the receiver and to adapt the transmission of the diagnostic frames to the value of the rate of probability of occurrence of a communication failure recalculated on each transmission of a control frame.

BRIEF DESCRIPTION OF THE FIGURES

Other features and advantages will emerge from the following detailed description, given in light of the attached drawings in which:

FIGS. 1 to 4 represent time diagrams illustrating the various principles of operation of the invention.

DETAILED DESCRIPTION OF AT LEAST ONE EMBODIMENT

Figure 1:
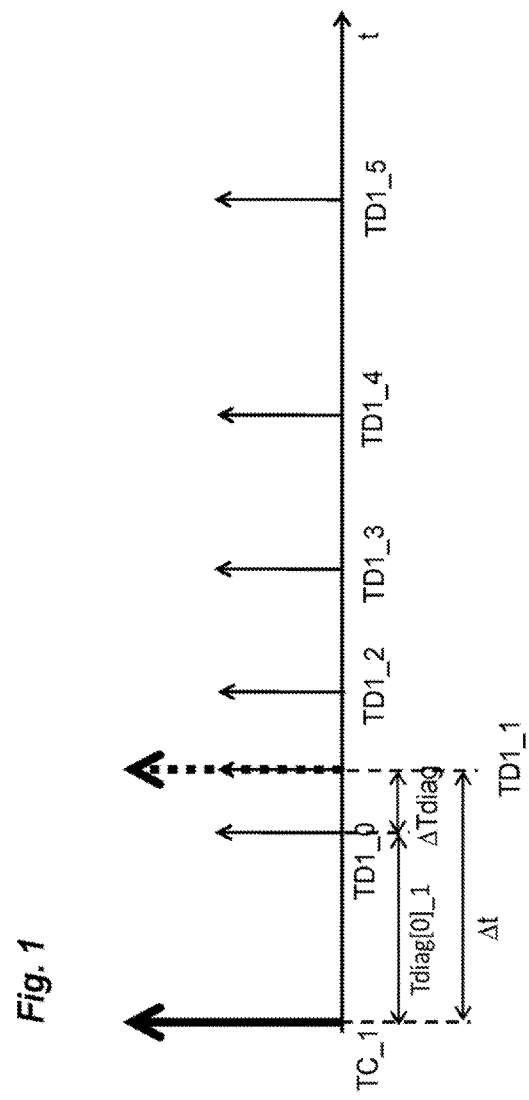
Figure 3:
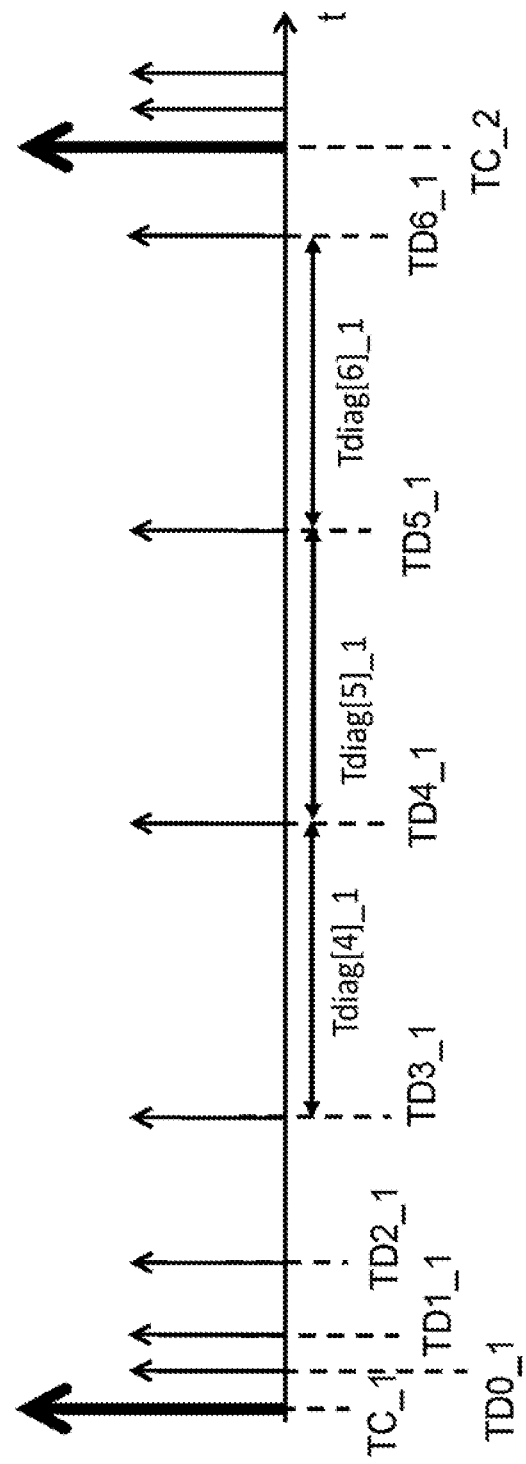

Hereinafter in the description:
the notation "TC_i" denotes both a control frame and the instant of transmission of this control frame,
the notation "TDx_i" denotes both a diagnostic frame and the instant of transmission of this diagnostic frame.

The method of the invention applies to an installation comprising at least one transmitting equipment item and one receiving equipment item connected together through a communication network of wired or wireless type. Obviously, each of these equipment items will be able to exercise both transmitting and receiving functions.

In this installation, the transmitting equipment item sends control frames to the receiving equipment item, for example for the control of a machine. The time Δt between the transmission of the control frame TC_i and the next control frame TC_i+1 (i being an integer ranging from 1 to n and defining the rank of the control frame, n being greater than or equal to 1) is not necessarily fixed.

The method of the invention consists in monitoring the communication between the transmitting equipment item and the receiving equipment item. It consists of the transmission of diagnostic frames TDx_i (x being an integer greater than 0 and defining the rank of the diagnostic frame after the control frame TC_i) dedicated to monitoring the communication. The objective of this monitoring is to know the state of the communication before the next control frame TC_i to be able to ensure that the latter has the best possible chance of being transmitted and received without failure. For this, at least one diagnostic frame TDx_i must be transmitted before the probable next transmission of a control frame TC_i. Generally, the instant of transmission of the first diagnostic frame TD0_i coming after a control frame TC_i is expressed by the following relationship:

$$TD0\_i = TC\_i + T\text{diag}[0]\_i$$

In which TD0_i corresponds to the instant of transmission of the diagnostic frame TD0_i and with:

$$T\text{diag}[0]\_i = \Delta t - \Delta t\text{diag} \quad (1)$$

In which:
Δt is a predefined minimum value corresponding to the minimum time to be observed between two control frames and making it possible to ensure the transmission of a diagnostic frame before the next control frame. In order to adapt the transmission of the diagnostic frames to the frequency of transmission of the control frames, the time Δt could be revised.
Δdiag is a time to be observed to guarantee a predefined reliability concerning the state of the communication and is expressed as follows:

$$\Delta t\text{diag} = \Delta t \frac{\text{Ln}(Fiab)}{\text{Ln}(1 - \tau_{fail})} \quad (2)$$

In which:
Fiab corresponds to a predefined reliability value for the communication, for example 99%,
$\tau_{fail}$ corresponds to the rate of probability of occurrence of a communication failure between two transmissions of control frames TC_i.

The instant of transmission TD0_i of the first diagnostic frame is thus determined from the minimum time to be observed between the transmission of two control frames, this time being known from the transmitting equipment item.

In the attached figures, the end of the time Δt is represented by a dotted vertical arrow. This instant of transmission does not correspond to the transmission of a control frame but to the instant from which a control frame could be transmitted.

According to the invention, as long as no new control frame TC_i has been sent by the transmitting equipment item, the latter sends, after the initial diagnostic frame, other diagnostic frames to the receiving equipment item. Preferentially, the diagnostic frames are transmitted at a variable frequency, making it possible to avoid a saturation of the communication and an overconsumption of energy on the part of the equipment items.

The instants of transmission of the diagnostic frames, which follow the first transmitted diagnostic frame TD0_i, are determined from an increasing function such as, for example, a geometrical series chosen to obtain transmission instants separated by a variable time. The increasing function making it possible to determine the instants of transmission of the diagnostic frames TDx_i (with x greater than or equal to 1) is, for example, the following geometrical series:

$$TDx\_i = TDx\_i-1 + T\text{diag}[x]\_i$$

$$T\text{diag}[x]\_i = r(x) \times T\text{diag}[x-1]\_i \quad (3)$$

In which r(x) corresponds to the reason for the series.

This increasing function makes it possible to change the time between two diagnostic frames, before the transmission of the next control frame, while ensuring a maximum reliability (close to 100%). With the time between the last control frame and the next control frame increasing, the occurrence of a communication failure reduces since this reliability rate is considered constant between two control frames. Also, even if the diagnostic frames are increasingly far apart from one another, the reliability concerning the state of the communication remains high, close to 100%. As long as no control frame has been transmitted by the transmitting equipment item, diagnostic frames are transmitted at the transmission instants determined using the relationship (3) above.

After each control frame transmission, the diagnostic method is reinitialized and the instant of transmission of the next diagnostic frame is determined using the relationship (1) above and the subsequent instants are determined using the relationship (3).

In FIG. 1, diagnostic frames are transmitted at the instants of transmission TD1_0 to TD_5 determined from the above relationship (3). In this figure, the fact that the frequency of transmission between the diagnostic frames is not fixed is clearly apparent.

FIGS. 2A and 2B make it possible to compare the solution of the invention with a solution of the prior art, in which diagnostic frames are transmitted at a fixed frequency. In FIG. 2A, corresponding to the method of the invention, monitoring is carried out with only the transmission of three diagnostic frames between the two first control frames. In FIG. 2B, corresponding to the solution of the prior art, for one and the same reliability rate of the communication, five diagnostic frames have to be transmitted over the same time in order to monitor the communication. Over a longer time between two data control frames, four diagnostic frames are necessary within the scope of the invention, whereas ten diagnostic frames will be necessary in the fixed frequency solution of the prior art.

Figure 4:
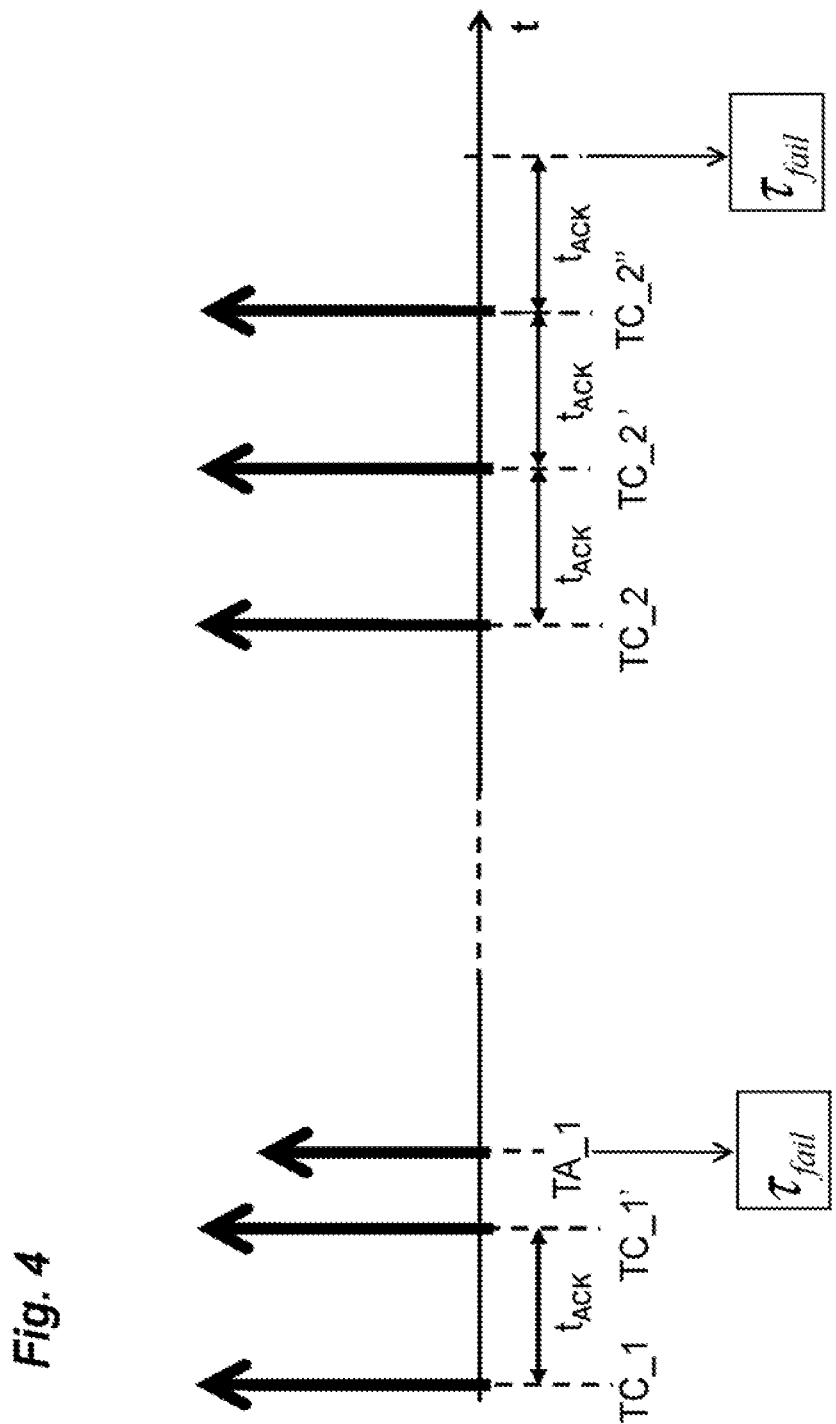

Advantageously, if the time between two diagnostic frames becomes too long, the latter can be limited to a determined upper value. This value will for example be the average time of transmission of the control frames. FIG. 4 illustrates such a solution in which the diagnostic frames TD4_1, TD5_1 and TD6_1 are transmitted at a fixed period, the latter corresponding to a maximum value, which can be stored for example by the transmitting equipment item.

Moreover, within one and the same application, the transmission frequency of the control frames is not necessarily fixed. It can be high in the adjustment phase and weaker in a phase of normal operation. To take account of these variations, the method of the invention makes it possible to revise, in real time, the time between each control frame. Combined with the method for determining diagnostic frames described above, the revision of the variability of the control frames will make it possible to further optimize the number of diagnostic frames transmitted.

The failure rate $\tau_{fail}$ reflects the rate of control frames incorrectly received. It is for example known practice to have the reception of a control frame by the receiving equipment item acknowledged to ensure a good transmission of the control frames. The transmitting equipment item is then notified of the reception or of the non-reception of each control frame TC_i and can launch the appropriate action. It is also well known for the transmitting equipment item to make a number of attempts to transmit a control frame before concluding on non-acknowledgement of the control frame, so doing in order to mask the untimely breaks in communication of very short duration. The calculation of the failure rate $\tau_{fail}$ can then for example be based on this acknowledgement process by measuring the number of frames acknowledged relative to the number of frames transmitted.

FIG. 4 illustrates the principle of the updating of the rate of probability of occurrence of a communication failure:
- The transmitting equipment item transmits a first control frame TC_1 to the receiving equipment item.
- After a determined time $t_{ACK}$, the transmitting equipment item has received no acknowledgement frame for this first control frame and once again transmits a control frame TC_1'.
- The transmitting equipment item receives an acknowledgement frame TA_1 for this last control frame TC_1'.
- The transmitting equipment item reduces the rate of probability of occurrence of a failure $\tau_{fail}$.
- The transmitting equipment item proceeds with a number of attempts to transmit a new control frame TC_2, TC_2', TC_2'' without receiving any acknowledgement frame.
- After the time $t_{ACK}$, the transmitting equipment item increases the rate of probability of occurrence of a failure $\tau_{fail}$.

After each transmission of a control frame, the failure rate $\tau_{fail}$ can thus be re-updated.

Moreover, the rate of probability of occurrence of a communication failure is defined in relation to Δdiag in the following expression, as defined above:

$$\Delta t diag = \Delta t \frac{\text{Ln}(Fiab)}{\text{Ln}(1 - \tau_{fail})} \qquad (2)$$

The revision of the rate of probability of occurrence of a communication failure will therefore have an influence on the optimization of the number of diagnostic frames transmitted.

The invention thus offers a number of advantages, notably:
- Optimizing the number of diagnostic frames transmitted, by revising the rate of probability of occurrence of a communication failure, while guaranteeing a high reliability concerning the state of the communication,
- Guaranteeing a reliability concerning the state of the communication close to 100%, while avoiding saturating the communication link and causing an overconsumption of electrical energy,
- Adapting the frequency of transmission of the diagnostic frames to the frequency of transmission of the control frames,
- Being simple to implement and being able to be adapted to communication networks of wired or wireless type.

The invention claimed is:

1. A method for monitoring a communication between a transmitting equipment item and a receiving equipment item, said transmitting equipment item transmitting control frames to the receiving equipment item, said method being comprising:
   transmission by the transmitting equipment item of n control frames TC_i to the receiving equipment item, i being an integer number ranging from 1 to n and defining the rank of each control frame, n being an integer number greater than or equal to 1,
   determination of an instant of transmission of a diagnostic frame of rank 0 after the transmission of one of the n control frames TC_i, said instant of transmission of said diagnostic frame being determined as follows:

$TD0\_i = TC\_i + T\text{diag}[0]\_i$ in which TD0_i corresponds to the instant of transmission of the diagnostic frame of rank 0 following the control frame TC_i and with:

$T\text{diag}[0]\_i = \Delta t - \Delta t\text{diag}$ in which:
   Δt corresponds to a predetermined minimum time between the transmission of two of the n control frames TC_i,
   Δtdiag corresponds to a time to be observed to guarantee a predefined reliability value concerning a state of the communication, and is expressed by the following relationship:

$$\Delta t diag = \Delta t \frac{\text{Ln}(Fiab)}{\text{Ln}(1 - \tau_{fail})}$$

in which:
   Fiab corresponds to the predefined reliability value,
   $\tau_{fail}$ corresponds to a rate of probability of occurrence of a communication failure between two control frames, said rate being revised according to whether the receiving equipment item has received each control frame or not, transmission by the transmitting equipment item of said diagnostic frame at the determined transmission instant, to the receiving equipment item, determination from an increasing function of the instants of transmission of subsequent diagnostic frames $TDx\_i$ of rank x, transmission of said subsequent diagnostic frames of rank x by the transmitting equipment item to the receiving equipment item.

2. The method according to claim 1, further comprising a step of revising the predetermined minimum time $\Delta t$ between the transmission of two control frames.

3. The method according to claim 1, further comprising a step of limitation to a maximum value of a time between two successive diagnostic frames, when the time between a first instant of transmission of a diagnostic frame of rank x and a second instant of transmission of a diagnostic frame of rank x exceeds said maximum value.

* * * * *